United States Patent
Boodman (10) Patent No.: US 10,013,497 B1
(45) Date of Patent: Jul. 3, 2018

(54) BACKGROUND RELOADING OF CURRENTLY DISPLAYED CONTENT

(71) Applicant: Google Inc., Mountain View, CA (US)

(72) Inventor: Aaron Boodman, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 276 days.

(21) Appl. No.: 14/489,376

(22) Filed: Sep. 17, 2014

Related U.S. Application Data (60) Provisional application No. 61/919,658, filed on Dec. 20, 2013.

(51) Int. Cl.
- G06F 3/048 (2013.01)
- G06F 17/30 (2006.01)
- G06F 3/0481 (2013.01)

(52) U.S. Cl.
CPC ........ G06F 17/3089 (2013.01); G06F 3/0481 (2013.01); *G06F 17/30902* (2013.01)

(58) Field of Classification Search
CPC .......... G06F 17/3089; G06F 17/30902; G06F 3/0481
See application file for complete search history.

(56) References Cited

U.S. PATENT DOCUMENTS

| | | | |
|---|---|---|---|
| 6,339,780 B1 | 1/2002 | Shell et al. | |
| 6,744,452 B1 * | 6/2004 | McBrearty | G06F 17/30902 707/E17.12 |
| 6,766,352 B1 * | 7/2004 | McBrearty | H04L 67/00 709/203 |
| 7,194,506 B1 | 3/2007 | White et al. | |
| 7,730,155 B1 * | 6/2010 | Meyer | H04W 4/02 709/201 |
| 8,615,583 B2 * | 12/2013 | Plamondon | H04L 67/2847 709/225 |
| 8,990,334 B2 * | 3/2015 | Barraclough | G06F 17/30867 709/213 |
| 9,503,499 B1 * | 11/2016 | Donaldson | H04L 67/02 |

(Continued)

OTHER PUBLICATIONS

Connolly, "Core Internet Application Development with asp.net 2.0," Feb. 2007.

(Continued)

*Primary Examiner* — Andrew T Chiusano
(74) *Attorney, Agent, or Firm* — McDermott Will & Emery LLP (57) ABSTRACT

Methods for loading a current version of a web page in the background of a previous version of the web page are provided. In one aspect, a method includes receiving a request to display a web page, and providing, for display, a previously visited version of the web page in response to the request. The method also includes determining whether an updated version of the web page is available. When the determination indicates an updated version of the web page is available, the method includes loading the updated version of the web page while the previously visited version of the web page is provided for display, and replacing the display of the previously visited version of the web page with a display of the updated version of the web page after the updated version of the web page has been loaded. Systems and machine-readable media are also provided.

15 Claims, 6 Drawing Sheets

(56) References Cited

U.S. PATENT DOCUMENTS

| | | |
|---|---|---|
| 2006/0041556 A1 | 2/2006 | Taniguchi et al. |
| 2006/0155728 A1 | 7/2006 | Bosarge |
| 2010/0011284 A1 | 1/2010 | Ramakrishna et al. |
| 2010/0070570 A1* | 3/2010 | Lepeska ............... H04L 67/289 709/203 |
| 2011/0202847 A1 | 8/2011 | Dimitrov |
| 2012/0044137 A1 | 2/2012 | Oddiraju et al. |
| 2012/0054440 A1 | 3/2012 | Doig et al. |
| 2013/0054514 A1* | 2/2013 | Barrett-Kahn .... G06F 17/30902 707/608 |
| 2013/0185643 A1 | 7/2013 | Greifeneder et al. |
| 2014/0136971 A1* | 5/2014 | Kumar .............. G06F 17/30902 715/273 |
| 2014/0189034 A1* | 7/2014 | Draznin ............ G06F 17/30902 709/213 |
| 2015/0205761 A1 | 7/2015 | Shah et al. |

OTHER PUBLICATIONS

Mangukiya, Microsoft asp.net Code Project, Screen Capture, Aug. 2012.
RFC2616: https://web.archive.org/web/20000815054159/http://www.w3.org/protocols/rfc2616/rfc2616sec14. published 2000.
"Performance Considerations in Applications for Windows Phone," Windows Phone Dev Center, Sep. 2012, retrieved from http://msdn.microsoft.com/en-us/library/windowsphone/develop/ff967560%28v=vs.92%29.aspx.

* cited by examiner

BACKGROUND RELOADING OF CURRENTLY DISPLAYED CONTENT

CROSS-REFERENCE TO RELATED APPLICATIONS

The present application claims the benefit of priority under 35 U.S.C. § 119 from U.S. Provisional Patent Application Ser. No. 61/919,658 entitled "Background Reloading of Currently Displayed Content," filed on Dec. 20, 2013, the disclosure of which is hereby incorporated by reference in its entirety for all purposes.

BACKGROUND

Field

The present disclosure generally relates to the transmission of data over a network, and more particularly to the use of a computing device to communicate over a network.

Description of the Related Art

Web browsers commonly load and display a web page in a web page browsing window (or "tab") of a web browser on a device in response to a request to load the web page. There is usually a delay between receiving the request to load the web page and the display of the web page. The delay is due in part to the time it takes to download the web page in response to the request. After viewing the web page in the tab, a user may then perform other activities on the device, such as browse web pages in other tabs or use other applications altogether. At a later point the user may seek to return to the web browser to view the web page that was previously loaded and displayed in the tab, and the web browser must reload the web page. During the delay caused by the time needed for the web browser to reload the web page the user commonly sees a blank screen, thereby creating latency between when the user seeks to view content and when the user actually sees the content.

SUMMARY

According to one embodiment of the present disclosure, a computer-implemented method for loading a current version of a web page in the background of a previous version of the web page is provided. The method includes receiving a request to display a web page, and providing, for display, a previously visited version of the web page in response to the request. The method also includes determining whether an updated version of the web page is available. When the determination indicates an updated version of the web page is available, the method includes loading the updated version of the web page while the previously visited version of the web page is provided for display, and replacing the display of the previously visited version of the web page with a display of the updated version of the web page after the updated version of the web page has been loaded.

According to one embodiment of the present disclosure, a system for loading a current version of a web page in the background of a previous version of the web page is provided. The system includes a memory that includes a previously visited version of a web page, and a processor. The processor is configured to receive a request to display the web page and provide, for display, the previously visited version of the web page in response to the request. The processor is also configured to determine whether an updated version of the web page is available. The processor is further configured to load, when the determination indicates an updated version of the web page is available, the updated version of the web page and provide, for display, a visual indicator that the updated version of the web page is loading while the previously visited version of the web page is provided for display. The processor is also configured to replace the display of the previously visited version of the web page with a display of the updated version of the web page after the updated version of the web page has been loaded.

According to one embodiment of the present disclosure, a machine-readable storage medium that includes machine-readable instructions for causing a processor to execute a method for loading a current version of a web page in the background of a previous version of the web page is provided. The method includes receiving a request to display a web page on a device, and providing, for display, a previously visited version of the web page stored in a memory of the device in response to the request. The method also includes determining whether an updated version of the web page is available. When the determination indicates an updated version of the web page is available, the method includes loading the updated version of the web page and providing, for display, a visual indicator that the updated version of the web page is loading while the previously visited version of the web page is provided for display. The method yet further includes replacing the display of the previously visited version of the web page with a display of the updated version of the web page after the updated version of the web page has been loaded, and when the determination indicates the updated version of the web page is available but the updated version of the web page is unable to be loaded, providing, for display, a visual indicator that the updated version of the web page is unavailable for display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed application provides previously viewed content for display substantially immediately in response to a user request while in the background determining whether an updated version of the content exists. If an updated version of the content exists, the application loads the content in the background while continuing to display the previously viewed content to the user, thereby permitting the user to have substantially immediate access to content for viewing after requesting the content and then replacing the previously viewed content with the updated version of the content after it has loaded in the background. In certain aspects, a visual indicator can be displayed with the previously viewed content in order to inform a user that an updated version of the content is loading in the background. When the updated version of the content has loaded in the background, the visual indicator may be removed and the previously viewed content can be swapped out in the application for the updated version of the content. If, however, the updated version of the content fails to load in the background, a different visual or audible indicator can be output that indicates the failure, and the user may then instead continue to view the previously viewed content in the application. In certain aspects, web pages can include instructions that restrict the application from displaying previously viewed content in response to a request to view content and instead wait for the loading and display of an updated version of the content.

Although many examples provided herein describe a user's information (e.g., local copies of content based on a user's browsing history) being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Figure 1:
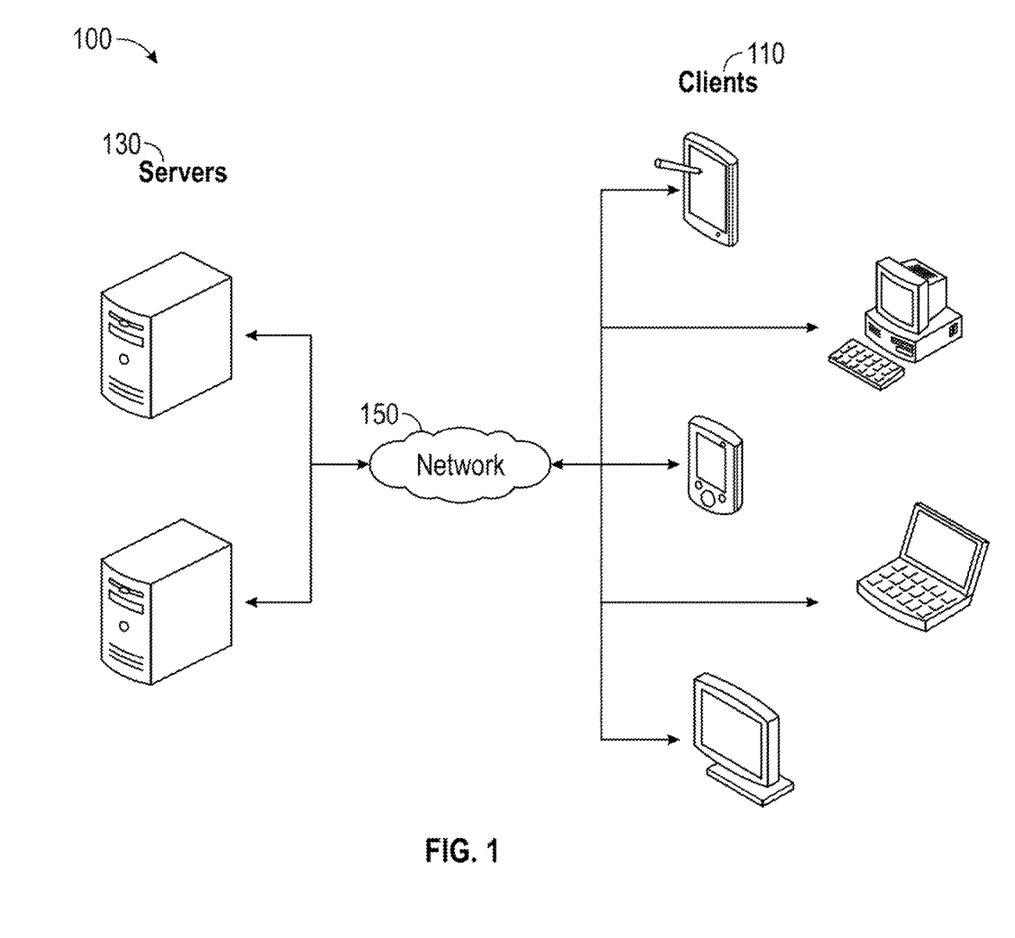
FIG. 1 illustrates an example architecture for loading a current version of a web page in the background of a previous version of the web page.

FIG. 1 illustrates an example architecture 100 for loading a current version of a web page in the background of a previous version of the web page. The architecture 100 includes servers 130 and clients 110 connected over a network 150.

Each of the many clients 130 is configured to include and execute an application for displaying content. The application can be, for example, a web browser, a document or text editing program, an image editing program, a video editing program, a gaming program, or any other program that displays content. The content can be, for example, a web page, a document, an image, a video, an audio file, a game, or other displayable content. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for displaying content.

In certain aspects, the content for display in the application can be obtained from one or many servers 130 over the network 150. The servers 130 can be any device having an appropriate processor, memory, and communications capability for hosting the content for display. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The application on the client 110 is configured to load and display the content. The content can be loaded for display, for example, in response to a request from a user of a client 110 to display the content. Initially, in response to the request from the user to display the content, a version of the content that is stored in memory of the client 110 ("local version") can be displayed by the application while the application determines if a more updated version of the content is available. If a more updated version of the content is available, the updated version of the content can be loaded in the background while the local version of the content is displayed. Optionally, the application can display a visual indicator to inform the user that the user is viewing a local version of the content and that an updated version of the content is loading. Once the updated version of the content has loaded, the application may replace the display of the local version of the content with a display of the updated version of the content.

Figure 2:
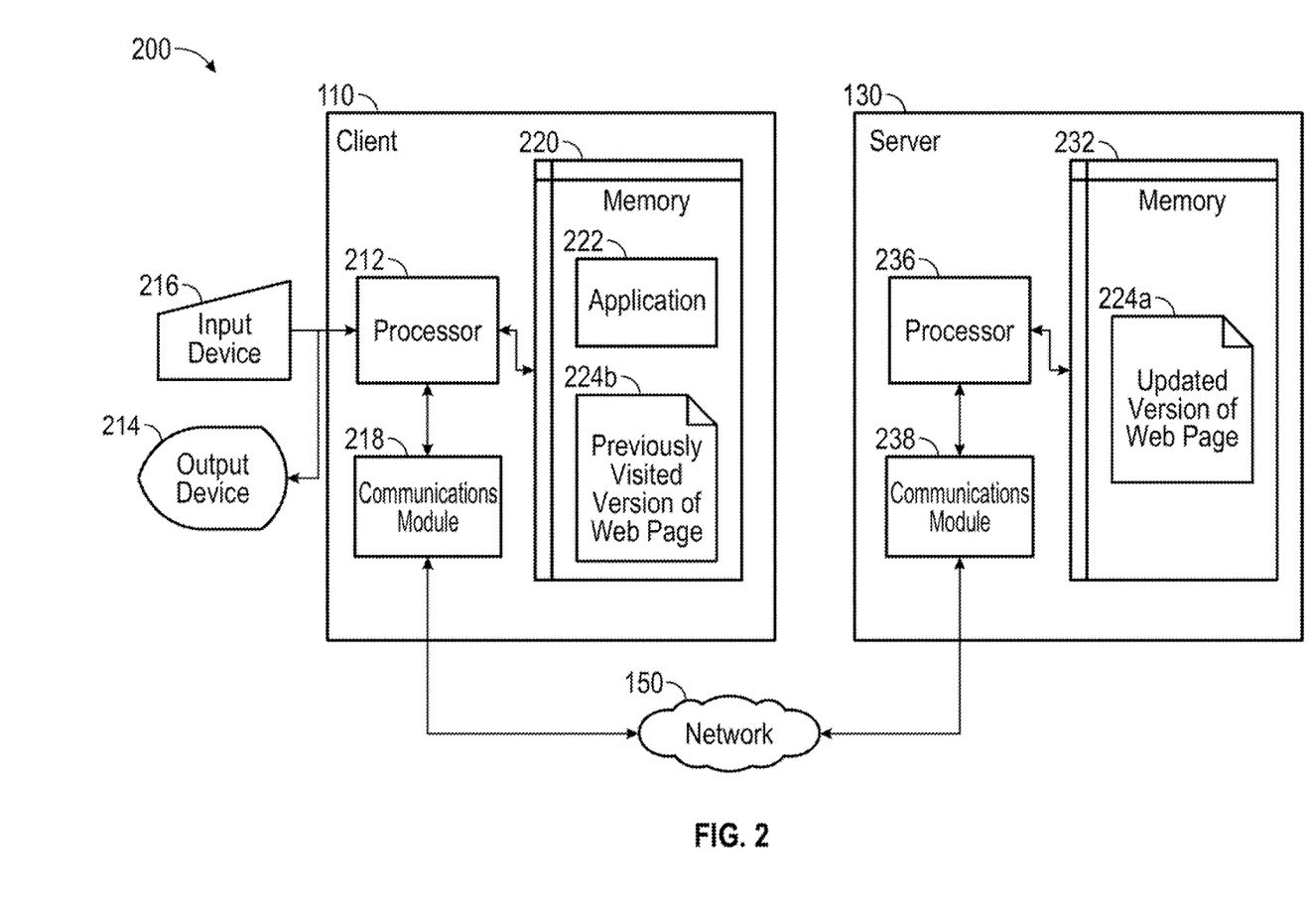
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes an application 222 and content for display in the application 222, such as a previously visited version of a web page 224b. As discussed herein, a "web page" is understood to include each file, including images and style sheets, which is needed for displaying of the web page, unless otherwise stated. The application can be a web browser, a document or text editing program, an image editing program, a video editing program, a gaming program, or any other program that displays content. By way of demonstration only, the example of the content as discussed herein will be a web page, although other content can be used with the disclosed system, such as a document, an image, a video, an audio tile, a game, or other displayable content. The client 110 also includes an input device 216, such as a keyboard, mouse, or touch input, and an output device 214, such as a touchscreen, monitor, or other type of display.

The processor 212 of the client 110 is configured to execute instructions, such as instructions physically coded into the processor 212, instructions received from software (e.g., application 222) in memory 220, or a combination of both, for loading an updated version of a web page 224a in the background of a previously visited version of the web page 224b. For example, the processor 212 of the client 110 executes instructions to receive (e.g., via input device 216) a request to display a web page and provide, for display (e.g., via output device 214), a previously visited version of the web page 224b in response to the request. For example, if the request to display the web page is received by the application 222, and the previously visited version of the web page 224b is displayed by the application 222, then the previously visited version of the web page 224b may have been stored in memory 220 by the application the last time the web page was loaded for display in the application 222.

In certain aspects, however, the web page may include an indicator permitting or restricting a previously visited version of the web page to be displayed in response to the request. Accordingly, the processor 212 of the client 110 may be configured to confirm that the previously visited version of the web page 224b includes the indicator permitting the previously visited version of the web page 224b to be displayed in response to the request, and then provide the previously visited version of the web page 224b for display in response to the request. In such cases, the processor 212 may be configured to provide the previously visited version of the web page 224b in response to the request by executing an instruction to serve the previously visited version of the web page 224b (e.g., from memory 220).

In certain aspects, if the application 222 is associated with an authenticated user of the client 110, the previously visited version of the web page 224b may be synchronized with other clients associated with the user where, for example, the other clients are also associated with the authenticated user. For example, if a user signs in to the application 222 on the client 110 and visits a web page, then a copy of the visited version of the web page can be stored both in the memory 220 of the client 110, and that copy can be sent to and stored in the memory of other clients on which the user has signed into the application 222.

The processor 212 is also configured to determine whether an updated version of the web page 224a is available (e.g., in a memory 232 of a server 130). For example, the processor 212 of the client 110 may send a "GET" request for an updated version of the web page 224a to the server 130, and the processor 236 of the server 130 may respond to the client 110 about the availability of an updated version of the web page 224a over the network 150 using the respective communication modules 238 and 218 of the server 130 and the client 130. In certain aspects, the processor 212 of the client 110 is configured to determine whether the updated version of the web page 224a is available subsequent to the instruction to serve the previously visited version of the web page 224b, and includes the processor 212 executing an instruction to validate whether the updated version of the web page 224a is available (e.g., on the server 130).

When the determination indicates an updated version of the web page 224a is available, the processor 212 of the client 110 is configured to load (e.g., download from the server 130) the updated version of the web page 224a while the previously visited version of the web page 224b is provided for display (e.g., in the application 222). In certain aspects, loading the updated version of the web page 224a while the previously visited version of the web page 224b is provided for display occurs by the processor 212 loading but not displaying the updated version 224a of the web page. This may occur where, for instance, the processor 212 downloads and renders the updated version of the web page 224a.

For example, after an authenticated user requests that the application 222 display a web page, the application 222 will display a previously visited version of the web page 224b in the application while an updated version of the web page 224a is downloaded and rendered in the background but not displayed (e.g., by the output device 214). In certain aspects, the processor 212 also provides, for display, a visual indicator that the updated version of the web page 224a is loading while the previously visited version of the web page 224b is provided for display. For example, the processor 212 can display in the user interface of the application 222 on the output device 214 a progress symbol (e.g., a status bar) overlaid on the display of the previously visited version of the web page 224b that indicates to a user that the updated version of the web page 224a is loading. If, however, the updated version of the web page 224a is available (e.g., in the memory 232 of the server 130), but the updated version of the web page 224a is unable to be loaded (e.g., because of an error in downloading the updated version of the web page 224a), then the processor 212 is configured to provide, for display, a visual indicator that the updated version of the web page 224a is unavailable for display. For example, when the previously visited version of the web page 224b is displayed in the user interface of the application 222 and the application 222 seeks to download the updated version of the web page 224a from the server 130 but the download fails, then a notification is provided for display in the user interface of the application 222 notifying the user that the user is viewing a previously visited version of the web page 224b and not the updated version of the web page 224a.

After the updated version of the web page 224a has successfully been loaded, the processor 212 is configured to replace the display of the previously visited version of the web page 224b with a display of the updated version of the web page 224a. For example, after the updated version of the web page 224a is downloaded into the memory 220 of the client 110, a display of the previously visited version of the web page 224b in the user interface of the application 222 in the output device 214 of the client 110 is replaced with a display of the updated version of the web page 224a in the user interface of the application 222.

In certain aspects where the requested web page links or otherwise calls for various external items (e.g., images, style sheets, audio, video, etc.) to be loaded for display with the web page, then the processor 212 is configured to provide an appropriate version of the item for display with the associated version of the web page. Specifically, when the previously visited version of the web page 224b includes a link to a first version of at least one item to be displayed with the previously visited version of the web page 224b, and the updated version of the web page 224a includes a link to a second version of the item to be displayed with the updated version of the web page 224a, then the processor 212 is configured to store an indicator (e.g., in memory 220) that the first version of the item is to be displayed with the previously visited version of the web page 224b, and the second version of the item is to be displayed with the updated version of the web page 224a. For example, if the web page includes a link to a style sheet defining, among other things, how fonts are to be displayed, and the previously visited version of the web page 224a includes a link to an initial version of the style sheet, then that initial version of the style sheet may not be compatible with an updated version of the web page 224a. Accordingly, the application 222 instructs the processor 212 to associate the initial version of the style sheet with the previously visited version of the web page, and associate a later version of the style sheet linked to by an updated version of the web page 224a with the updated version of the web page 224a.

Figure 3:
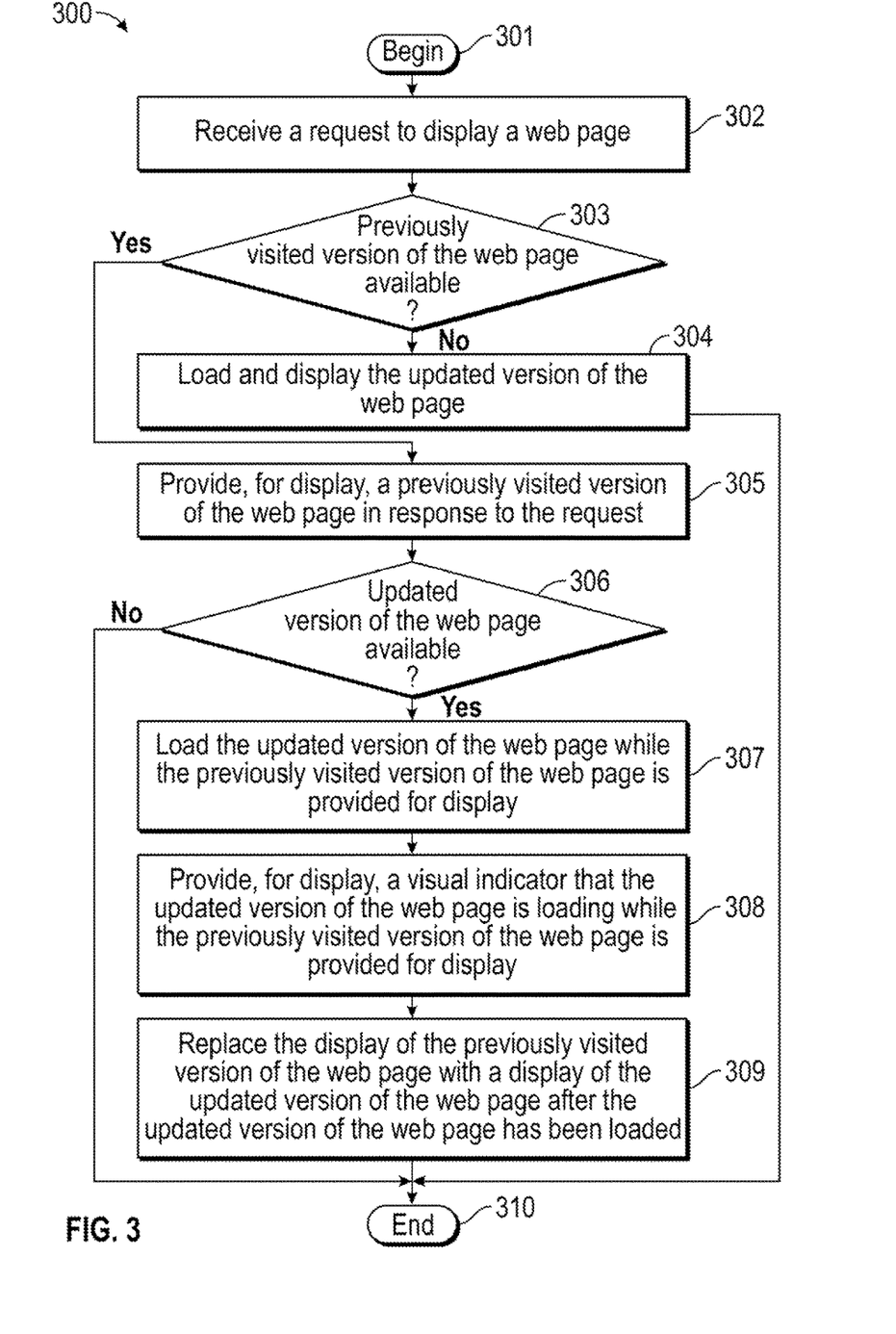
FIG. 3 illustrates an example process for loading a current version of a web page in the background of a previous version of the web page using the example client of FIG. 2.

FIG. 3 illustrates an example process 300 for loading a current version of a web page in the background of a previous version of the web page using the example client 110 of FIG. 2. While FIG. 3 is described with reference to FIG. 2, it should be noted that the process steps of FIG. 3 may be performed by other systems.

The process 300 begins by proceeding from beginning step 301 when an application 222 is loaded on a client 110 to step 302 when a request to display a web page is received by the application 222. Next, in decision step 303, a determination is made whether a previously visited version of the web page is available in the memory 220 of the client 110.

If the determination of step 303 indicates that a previously visited version of the web page is not available, then the process 300 proceeds step to 304 in which an updated version of the web page is loaded and displayed on the output device 214 of the client 110. If, however, the determination of step 303 indicates that a previously visited version of the web page 224b is available (e.g., in memory 220 of the client 110), then the process 300 proceeds to step 305 in which the previously visited version of the web page 224b is provided for display in response to the request (i.e., of step 302). Next, in decision step 306, a determination is made whether an updated version of the web page is available.

If the determination of step 306 indicates that an updated version of the web page 224a is not available (e.g., on the server 130), then the process 300 ends in step 310 (e.g., because the previously visited version of the web page 224b is the most up to date version of the web page).

If, however, the determination of step 306 indicates that an updated version of the web page 224a is available (e.g., on the server 130), then the process 300 proceeds to step 307 in which the updated version of the web page is loaded while the previously visited version of the web page 224b is provided for display, and then in step 308 a visual indicator is provided for display that the updated version of the web page 224a is loading while the previously visited version of the web page 224b is provided for display. The process 300 proceeds to step 309 in which the display of the previously visited version of the web page 224b is replaced with a display of the updated version of the web page 224a after the updated version of the web page 224a has been loaded (e.g., in the memory 220 of the client 110), and the process 300 then ends in step 310.

FIG. 3 set forth an example process 300 for loading a current version of a web page in the background of a previous version of the web page using the example client 110 of FIG. 2. An example will now be described using the example process 300 of FIG. 3, an application 222 that is a web browser, and a client 110 that is a smartphone.

Figure 4A:
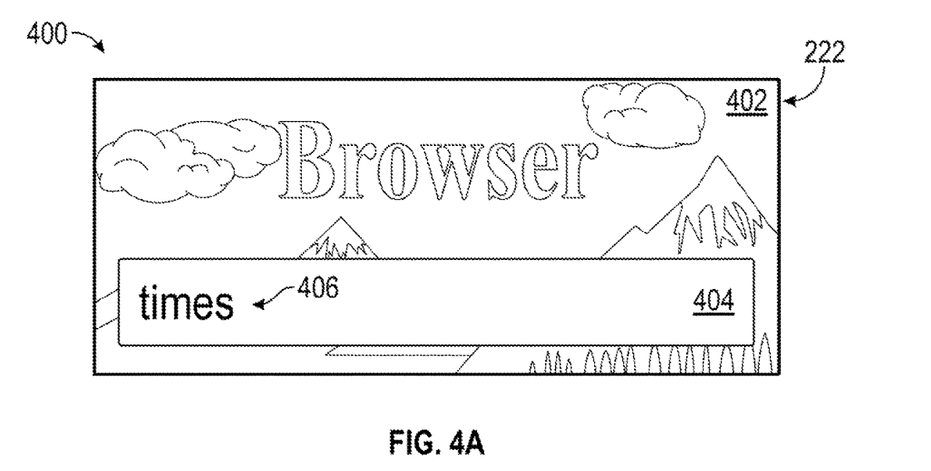
FIGS. 4A-4C are example illustrations associated with the example process of FIG. 3.

The process 300 begins by proceeding from beginning step 301 when a web browser 222 is loaded on a smartphone 110 to step 302 when a request to display a web page is received by the web browser 222 through the submission of a word query "times" 406 to an omnibox 404 (i.e., an input field configured to receive both search queries and web addresses) displayed in the interface 402 of the web browser 222 as provided in the example illustration 400 of FIG. 4A. Next, in decision step 303, a determination is made whether a previously visited version of the web page locally stored in the memory 220 of the smartphone 110.

Figure 4B:
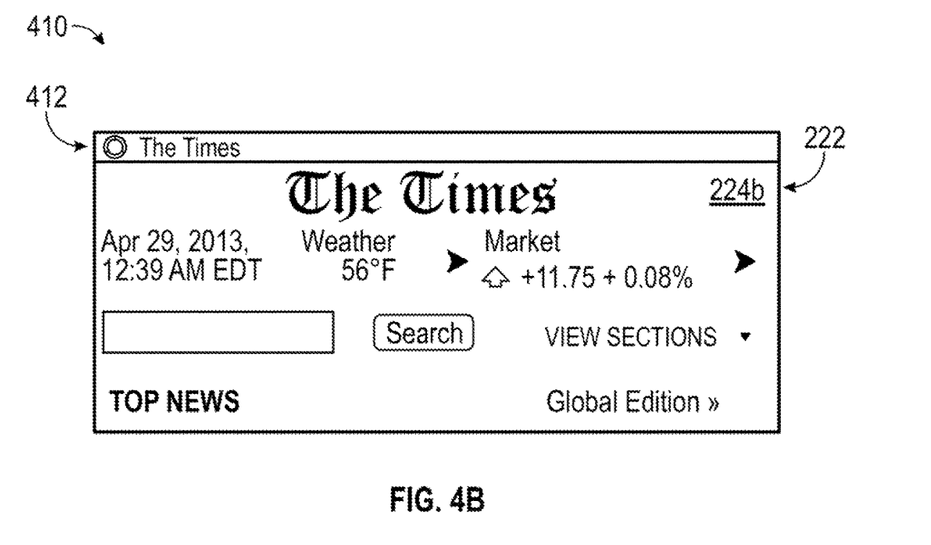

The determination of step 303 indicates that a previously visited version of the web page 224b is available (e.g., in memory 220 of the smartphone 110), and the process 300 proceeds to step 305 in which the previously visited version of the web page 224b is provided for display in response to the request (i.e., of step 302) as provided in the example illustration 410 of FIG. 4B. Next, in decision step 306, a determination is made whether an updated version of the web page is available.

Figure 4C:
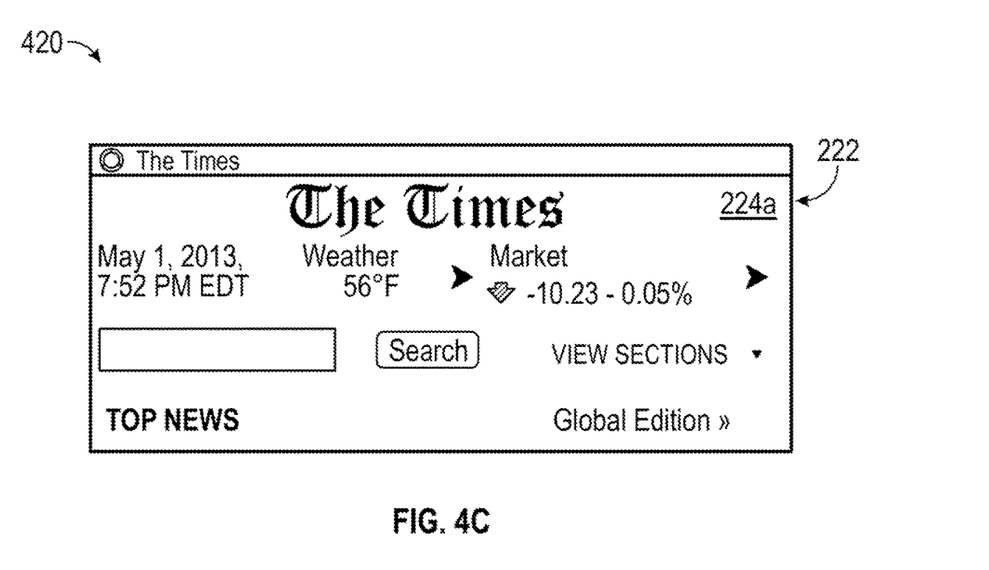

The determination of step 306 indicates that an updated version of the web page 224a is available (e.g., on the server 130), and the process 300 proceeds to step 307 in which the updated version of the web page 224a is loaded while the previously visited version of the web page 224b is provided for display. In step 308 a visual indicator 412 is provided for display that the updated version of the web page 224a is loading while the previously visited version of the web page 224b is provided for display as illustrated in FIG. 4B. The process 300 proceeds to step 309 in which the display of the previously visited version of the web page 224b in the web browser 222 is replaced with a display of the updated version of the web page 224a after the updated version of the web page 224a has been loaded (e.g., in the memory 220 of the client 110) as provided in the example illustration 420 of FIG. 4C, and the process 300 then ends in step 310.

Figure 5:
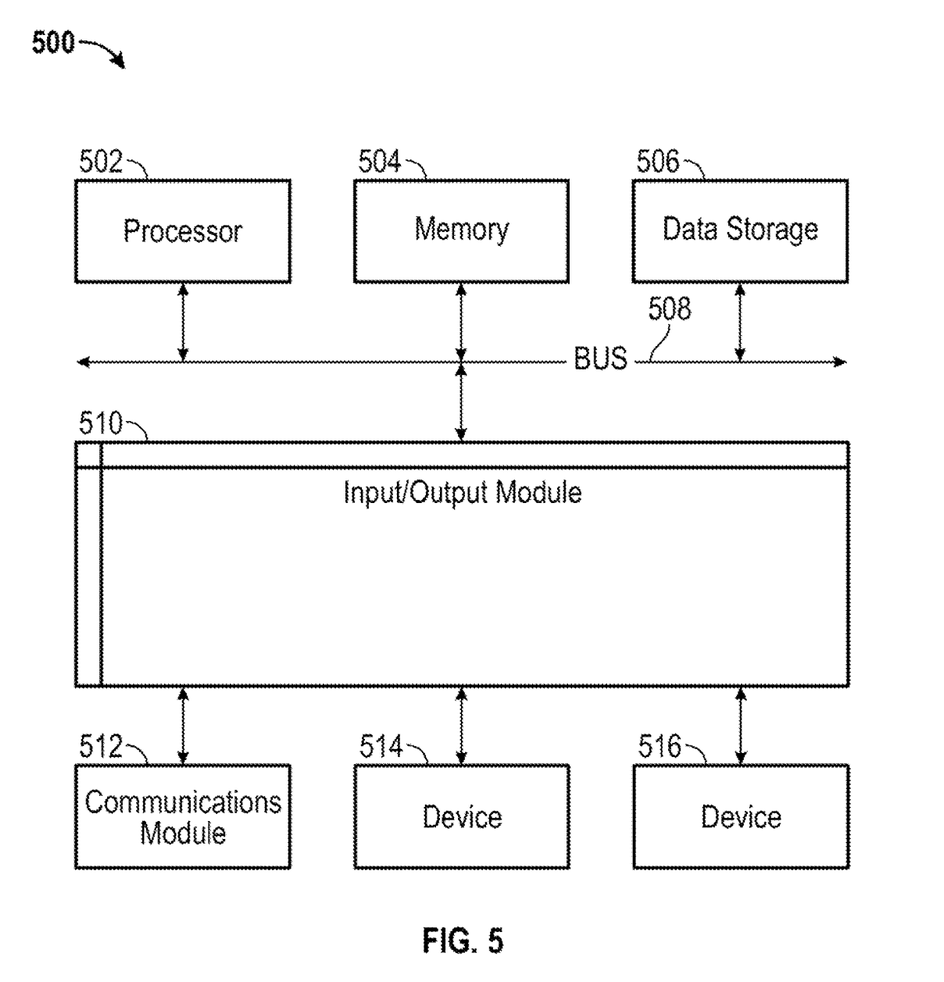
FIG. 5 is a block diagram illustrating an example computer system with which the client and server of FIG. 2 can be implemented.

FIG. 5 is a block diagram illustrating an example computer system 500 with which the client 110 and server of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., clients 110 and servers 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for loading a current version of a web page, the method comprising:

receiving, in a memory of a local device, a previously visited version of a web page from a remote client computing device over a network based on authentication to a user account associated with the remote client computing device;

receiving by the local device a first request from a user to display the web page;

providing, for display in response to the first request, the received previously visited version of the web page stored in the memory of the local device;

determining that an updated version of the web page is available at a server remote from the local device;

initiating, in response to determining that the updated version is available, a second request to load the updated version of the web page while the previously visited version of the web page is provided for display, and providing, for display, a visual indicator that the updated version of the web page is loading while the previously visited version of the web page is provided for display;

determining that the updated version cannot be loaded; and providing, for display with the display of the previously visited version of the web page and in response to determining that the updated version cannot be loaded, another visual indicator that the previously visited version of the web page is being displayed and not the updated version of the web page.

2. The method of claim 1, wherein the loading the updated version of the web page while the previously visited version of the web page is provided for display comprises loading but not displaying the updated version of the web page.

3. The method of claim 2, wherein loading but not displaying the updated version of the web page comprises downloading and rendering the updated version of the web page.

4. The method of claim 1,
wherein the previously visited version of the web page comprises a link to a first version of at least one item to be displayed with the previously visited version of the web page, wherein the updated version of the web page comprises a link to a second version of the at least one item to be displayed with the updated version of the web page, and wherein the method further comprises storing, in the memory of the local device, an indicator that the first version of the at least one item is only to be displayed with the previously visited version of the web page, and the second version of the at least one item is only to be displayed with the current version of the web page.

5. The method of claim 1, wherein the providing the previously visited version of the web page in response to the first request comprises executing an instruction to serve the previously visited version of the web page, and wherein the determining whether the updated version of the web page is available occurs subsequent to the instruction to serve the previously visited version of the web page and comprises executing an instruction to validate whether the updated version of the web page is available.

6. The method of claim 1, wherein the previously visited version of the web page is synchronized with multiple devices associated with the user account.

7. The method of claim 1, wherein providing the previously visited version of the web page for display in response to the first request comprises confirming that the previously visited version of the web page includes an indicator permitting the previously visited version of the web page to be displayed when the determination indicates the updated version of the web page is available.

8. A system for loading a current version of a web page, the system comprising:
   a memory comprising a previously visited version of a web page; and
   a processor configured to:
     receive, in the memory, a previously visited version of the web page from a remote client computing device over a network based on authentication to a user account associated with the remote client computing device:
     receive a first request from a user to display the web page;
     provide, for display in response to the first request, the received previously visited version of the web page from the memory;
     determine that an updated version of the web page is available at a server remote from the system; and
     initiate, in response to determining that the updated version is available, a second request to load the updated version of the web page and provide, for display, a visual indicator that the updated version of the web page is loading while the previously visited version of the web page is provided for display;
     determining that the updated version cannot be loaded;
     provide, for display, a visual indicator that the updated version of the web page is loading while the previously visited version of the web page is provided for display; and
     provide, for display with the display of the previously visited version of the web page and in response to determining that the updated version cannot be loaded, another visual indicator that the previously visited version of the web paae is being displayed and not the updated version of the web page.

9. The system of claim 8, wherein the processor being configured to load the updated version of the web page while the previously visited version of the web page is provided for display comprises the processor being configured to load but not display the updated version of the web page.

10. The system of claim 9, wherein the processor being configured to load but not display the updated version of the web page comprises the processor being configured to download and render the updated version of the web page.

11. The system of claim 8,
wherein the previously visited version of the web page comprises a link to a first version of at least one item to be displayed with the previously visited version of the web page,
wherein the updated version of the web page comprises a link to a second version of the at least one item to be displayed with the updated version of the web page, and
wherein the processor is further configured to store, in the memory, an indicator that the first version of the at least one item is only to be displayed with the previously visited version of the web page, and the second version of the at least one item is only to be displayed with the current version of the web page.

12. The system of claim 8, wherein the processor being configured to provide the previously visited version of the web page in response to the first request comprises the processor being configured to execute an instruction to serve the previously visited version of the web page, and wherein the processor being configured to determine whether the updated version of the web page is available occurs subsequent to the instruction to serve the previously visited version of the web page and comprises executing an instruction to validate whether the updated version of the web page is available.

13. The system of claim 8, wherein the previously visited version of the web page is synchronized with multiple devices associated with the user account.

14. The system of claim 8, wherein the processor being configured to provide the previously visited version of the web page for display in response to the first request comprises the processor being configured to confirm that the previously visited version of the web page includes an indicator permitting the previously visited version of the web page to be displayed when the determination indicates the updated version of the web page is available.

15. A non-transitory machine-readable storage medium comprising machine-readable instructions for causing a processor to execute a method for loading a current version of a web page, the method comprising:
   receiving, in a memory of a local device associated with the processor, a previously visited version of the web page from a remote client computing device over a network based on authentication to a user account associated with the remote client computing device;
   receiving by the local device a first request from a user to display the web page on the local device;
   providing, for display in response to the first request, the received previously visited version of the web page stored in a memory of the device;
   determining that an updated version of the web page is available remote from the local device;
   initiating, in response to determining that the updated version is available, a second request to load the updated version of the web page, and, for display, a visual indicator that the updated version of the web page is loading while the previously visited version of the web page is provided for display; and
   provide, for display with the display of the previously visited version of the web page and in response to determining that the updated version cannot be loaded, another visual indicator that the previously visited version of the web page is being displayed and not the updated version of the web page.

\* \* \* \* \*